United States Patent
Dow et al.

(10) Patent No.: US 10,318,744 B2
(45) Date of Patent: **\*Jun. 11, 2019**

(54) TOUCHSCREEN IMAGE MAPPING FOR AUGMENTED REALITY DEVICES

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Joseph D. Harvey, Binghamton, NY (US); Douglas E. Rohde, East Meadow, NY (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/809,572

(22) Filed: Jul. 27, 2015

(65) Prior Publication Data
US 2017/0032131 A1 Feb. 2, 2017

(51) Int. Cl.
*G06F 21/31* (2013.01)
*G06F 21/60* (2013.01)
(Continued)

(52) U.S. Cl.
CPC ......... *G06F 21/602* (2013.01); *G02B 27/017* (2013.01); *G02B 27/0172* (2013.01);
(Continued)

(58) Field of Classification Search
CPC ...... G06F 21/602; G06F 3/0416; G06F 21/31; G06F 3/412; G06F 3/147; G02B 27/0172;
(Continued)

(56) References Cited

U.S. PATENT DOCUMENTS

2012/0218188 A1 8/2012 Kashitani
2012/0218470 A1 8/2012 Schaefer
(Continued)

OTHER PUBLICATIONS

Dow et al., "Touchscreen Image Mapping for Augmented Reality Devices", U.S. Appl. No. 14/883,983, filed Oct. 15, 2015, pp. 1-25.
(Continued)

*Primary Examiner* — Linglan E Edwards
*Assistant Examiner* — Forrest L Carey
(74) *Attorney, Agent, or Firm* — David B. Woycechowsky

(57) ABSTRACT

As disclosed herein a method, executed by a computer, includes receiving, from an augmented reality device, a pairing request, negotiating with the augmented reality device to generate a new encryption key and a mapping plan for presenting optically readable codes, that correspond to one or more images, on a touch sensitive display device. The method further includes presenting, on the touch sensitive display device, the optically readable codes, and receiving a user selection from the touch sensitive display device. The optical codes are overlayed by the wearers of an augmented reality system with an un-encrypted or otherwise modified form of the optical code. A computer system, and a computer program product corresponding to the above method are also disclosed herein.

9 Claims, 4 Drawing Sheets

(51) Int. Cl.
*H04L 9/08* (2006.01)
*G02B 27/01* (2006.01)
*G06F 3/041* (2006.01)
*G06F 3/147* (2006.01)

(52) U.S. Cl.
CPC .......... *G06F 3/0412* (2013.01); *G06F 3/147* (2013.01); *G06F 21/31* (2013.01); *H04L 9/0819* (2013.01); *G02B 2027/014* (2013.01); *G02B 2027/0178* (2013.01); *G02B 2027/0187* (2013.01); *G06F 3/0416* (2013.01); *G09G 2354/00* (2013.01)

(58) Field of Classification Search
CPC .......... G02B 2027/0178; G02B 27/017; G02B 2027/014; G02B 2027/0187; G06T 19/006; G09G 5/003; G09G 2370/16; G09G 2354/00; H04L 9/0819
See application file for complete search history.

(56) References Cited

U.S. PATENT DOCUMENTS

| | | | |
|---|---|---|---|
| 2013/0159196 A1 | 6/2013 | DiZoglio | |
| 2014/0299660 A1* | 10/2014 | Melzer | G06F 3/011 235/375 |
| 2015/0126279 A1* | 5/2015 | Lyons | G07F 17/3204 463/33 |
| 2015/0154598 A1* | 6/2015 | Forte | G06F 21/83 380/28 |
| 2015/0244699 A1 | 8/2015 | Hessler | |
| 2016/0092877 A1* | 3/2016 | Chew | G06Q 20/4012 705/72 |
| 2016/0283708 A1* | 9/2016 | Getchius | G06F 21/36 |

OTHER PUBLICATIONS

IBM Appendix P, list of patents and patent applications treated as related, Oct. 15, 2015, pp. 1-2.
Dow et al., "Numeric Keypad Encryption for Augmented Reality Devices", U.S. Appl. No. 14/685,889, filed Apr. 14, 2015, pp. 1-24.
Dow et al., "Leader and Follower Management System for Wearable Devices", U.S. Appl. No. 14/754,756, filed Jun. 30, 2015, pp. 1-33.

* cited by examiner

TOUCHSCREEN IMAGE MAPPING FOR AUGMENTED REALITY DEVICES

BACKGROUND

The present invention relates to augmented reality, and more particularly to using augmented reality in conjunction with touchscreen technology to secure input on touchscreen devices.

In the computerized world of today, computers provide various forms of security through the use of passwords, personal identification numbers (PINs), access codes, and the like as a means for an individual to identify himself. For example, some secure locations (e.g., a secured parking area or building security systems) require a valid password or access code before allowing entry. Devices such as smart phones and tablets may require a password or PIN to authenticate an individual as a valid user and grant access to the functions of the device. Automated teller machines (ATMs) require a PIN in conjunction with a banking card to authenticate an individual performing banking activities.

Augmented reality is a technology that superimposes (e.g., overlays) a computer-generated image on a user's view of the real world, thus providing a composite view. In many cases an augmented reality system aligns the superimposed imagery with specific elements of the physical world. Some augmented reality approaches rely, at least in part, upon a head-mounted display. These head-mounted displays often have the form-factor of a pair of glasses. Such displays superimpose computer generated images over a portion, though typically not all of, a user's view of the world.

SUMMARY

As disclosed herein a method, executed by a computer, includes receiving, from an augmented reality device, a pairing request, and negotiating with the augmented reality device to generate a new encryption key and a mapping plan for presenting optically readable codes, that correspond to one or more images, on a touch sensitive display device. The method further includes presenting, on the touch sensitive display device, the optically readable codes, and receiving a user selection from the touch sensitive display device. A computer system, and a computer program product corresponding to the above method are also disclosed herein.

DETAILED DESCRIPTION

Individuals protect their personal property and guard against theft of their personal information by requiring passwords, personal identification numbers (PINs), access codes, and the like to gain access to the personal property or information. Securing personal information is critical to avoiding identity theft. Each time an individual enters his personal access information (e.g., a password, PIN, access code, or the like) on an input device (e.g., a touchscreen device), there is a risk that the personal access information may be compromised. An attacker may look over the shoulder of the user, or use a camera to record the personal access information, allowing the unsuspecting user's personal property and/or personal information to become compromised.

Devices that utilize traditional access methods (e.g., a PIN) may be equipped with features in an attempt to protect personal information. For example, some devices are equipped with physical shields located around the input area of the device to impair the vision of an attacker. This protective feature offers a small angle of protection but may make the input device more difficult for the user to access. Another protective feature utilized is angle-sensitive screens. However, these screens may be difficult for the user to read even at a normal viewing angle. Furthermore, both protective features are still susceptible to recording devices and post-use analysis (i.e., dusting the keypad for fingerprints or other traces of contact). It has been determined that there is a need for a more secure way of entering personal access information on touch sensitive input devices. The embodiments disclosed herein generally address the above-described problems.

Figure 1:
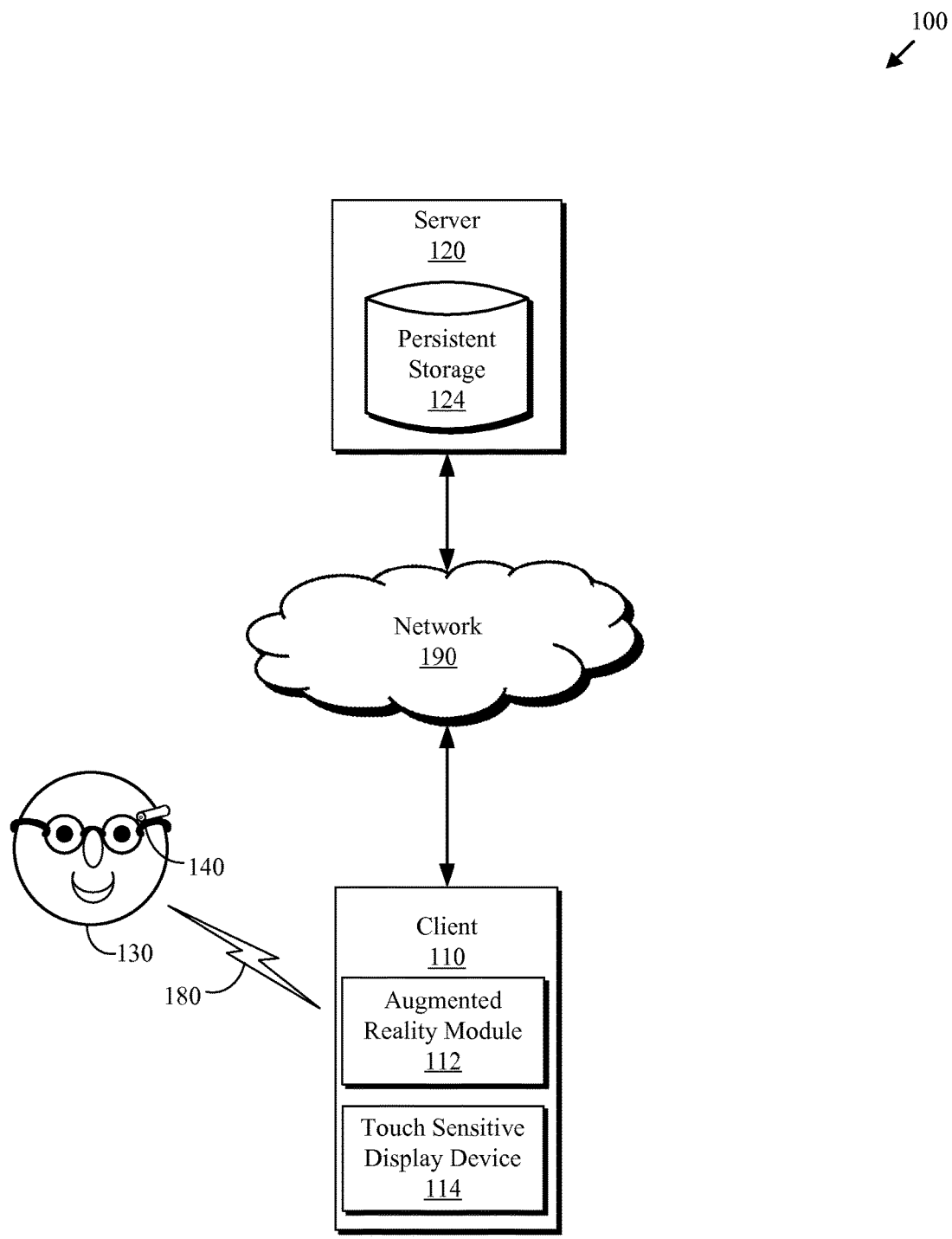
FIG. 1 is a functional block diagram depicting an augmented reality computing environment in accordance with at least one embodiment of the present invention.

The present invention will now be described in detail with reference to the Figures. FIG. 1 is a functional block diagram depicting an augmented reality computing environment 100 in accordance with at least one embodiment of the present invention. Augmented reality computing environment 100 includes client 110, and server 120 which can be a smart phones, tablets, desktop computers, laptop computers, specialized computer servers, or any other computer systems, known in the art, capable of communicating over network 190. In some embodiments, client 110 and server 120 represent computer systems utilizing clustered computers and components to act as a single pool of seamless resources. In general, client 110 and server 120 are representative of any electronic devices, or combination of electronic devices, capable of executing machine-readable program instructions, as described in greater detail with regard to FIG. 4.

As depicted, client 110 includes augmented reality module 112 and touch sensitive display device 114. Touch sensitive display device 114 may be any input and output (I/O) device connected to client 110 that can detect and respond to a finger, stylus, or similar object touching or hovering in proximity to the I/O device (e.g., a touchscreen or a near field or haptic display). Touch sensitive display device 114 is referred to as touchscreen device 114 hereinafter. Examples of touchscreen device 114 may include, but are not limited to, smart phone screens, tablet screens, notebook computer touchscreens, automated teller machine (ATM) screens, kiosk screens (such as an airport check-in kiosk), and security system control pads. Augmented reality module 112 may be configured to monitor augmented reality connection requests, for example, pairing requests from an augmented reality device (such as augmented reality device 140). Additionally, augmented reality module 112 may be configured to manage I/O activities with touchscreen device 114. In some embodiments, the user may have the option of disabling augmented reality module 112 and viewing images on touchscreen device 114 without using augmented reality device 140.

User 130 may interact with client 110 and touchscreen device 114 using augmented reality device 140. Augmented reality device 140 may be a heads-up display (HUD). A HUD is any transparent display that presents data without requiring users to look away from their usual viewpoints. Often this display is translucent or semi-translucent thereby providing a blend of computer generated imagery overlaid onto a view of the natural world. In the exemplary embodiment, augmented reality device 140 is a head-mounted HUD that is worn by the user. It should be appreciated, however, that any other suitable augmented reality device may be used. Augmented reality device 140 may overlay optically readable codes contained on touchscreen device 114 with corresponding images that are only visible to the user of augmented reality device 140.

Augmented reality module 112 may control the placement of optically readable codes on touchscreen device 114. Each optically readable code may be encrypted so that an attacker cannot decode the optically readable code. The placement and sizing of the optically readable codes on touchscreen device 114 may be randomized so that an attacker cannot detect or predict a pattern to gain access to the device or the application being protected by the device (e.g., a banking application). After the optically readable codes are placed on touchscreen device 114, they may be referred to as anchor points for images that may overlay touchscreen device 114 when using augmented reality device 140.

Augmented reality device 140 may decode each optically readable code (i.e., anchor point) to identify an image corresponding to each anchor point. When touchscreen device 114 is in the view path of augmented reality device 140, augmented reality device 140 may then overlay each anchor point on touchscreen device 114 with the image corresponding to the anchor point. In some embodiments, the images are pictures of individuals, and the user has to choose the pictures of his immediate family to satisfy the authentication challenge. In another embodiment, the images are pictures of animals (e.g., cats, dogs, goldfish, hamsters, and the like), and the user has to choose the picture(s) of his pet(s) to satisfy the authentication challenge. In yet another embodiment, the images are of the numbers 0-9, and the user is to enter his PIN from the randomly located numbers.

The user may reconfigure the information presented when using touchscreen device 114 and augmented reality device 140. Reconfiguring the information may comprise resizing or repositioning one or more images (e.g., using pinch and zoom gestures), or removing one or more images (e.g., using techniques such as the long touch to activate wiggle mode to remove a button completely). In some embodiments, the user may have the option of disabling augmented reality module 112 and viewing images on touchscreen device 114 without using augmented reality device 140.

In some embodiments, the optically readable codes comprise quick response codes (QR codes) that function as anchor points for the images that may be visible when viewed through augmented reality device 140. In other embodiments, the optically readable codes comprise bar codes that function as anchor points for images that may be visible when viewed through augmented reality device 140. In another embodiment, technology using predefined color palettes with specially interpreted meaning is used (e.g., green screen technology similar to that used in weather broadcasting to project computer images behind an individual, "magic pink" technology as known to those skilled in the art of web programming, or any other predefined color palette with specially interpreted meaning). There may be additional approaches of implementing the overlay operation familiar to those of skill in the art.

Augmented reality device 140 may communicate with client 110 over a secure personal area network (PAN) 180. PAN 180 may include wired, wireless, or fiber optic connections. PAN 180 may use wireless Bluetooth technology, optical signals that are out of the visible spectrum, audio based communications, or any other secure communication technologies known to those of skill in the art.

In the depicted embodiment, server 120 is a single server, however, in other embodiments, server 120 may be comprised of multiple servers co-located in a single data center, dispersed in separate data centers, or be maintained through cloud services. In another embodiment, Server 120 and client 110 are the same computer. Server 120 may contain personal information corresponding to user 130 which is retained on persistent storage 124. In some embodiments, server 120 is a banking server containing personal baking information for individuals attempting to make a cash withdrawal from an ATM. In other embodiments, server 120 is an airline ticking database continuing personal flight information for individuals attempting to print boarding passes at an airport kiosk.

Persistent storage 124 may be any non-volatile storage media known in the art. For example, persistent storage 124 can be implemented with a tape library, optical library, one or more independent hard disk drives, or multiple hard disk drives in a redundant array of independent disks (RAID). Similarly, data on persistent storage 124 may conform to any suitable storage architecture known in the art, such as a file, a relational database, an object-oriented database, and/or one or more tables.

Client 110, server 120, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between client 110 and server 120 in accordance with an embodiment of the present invention.

Figure 2:
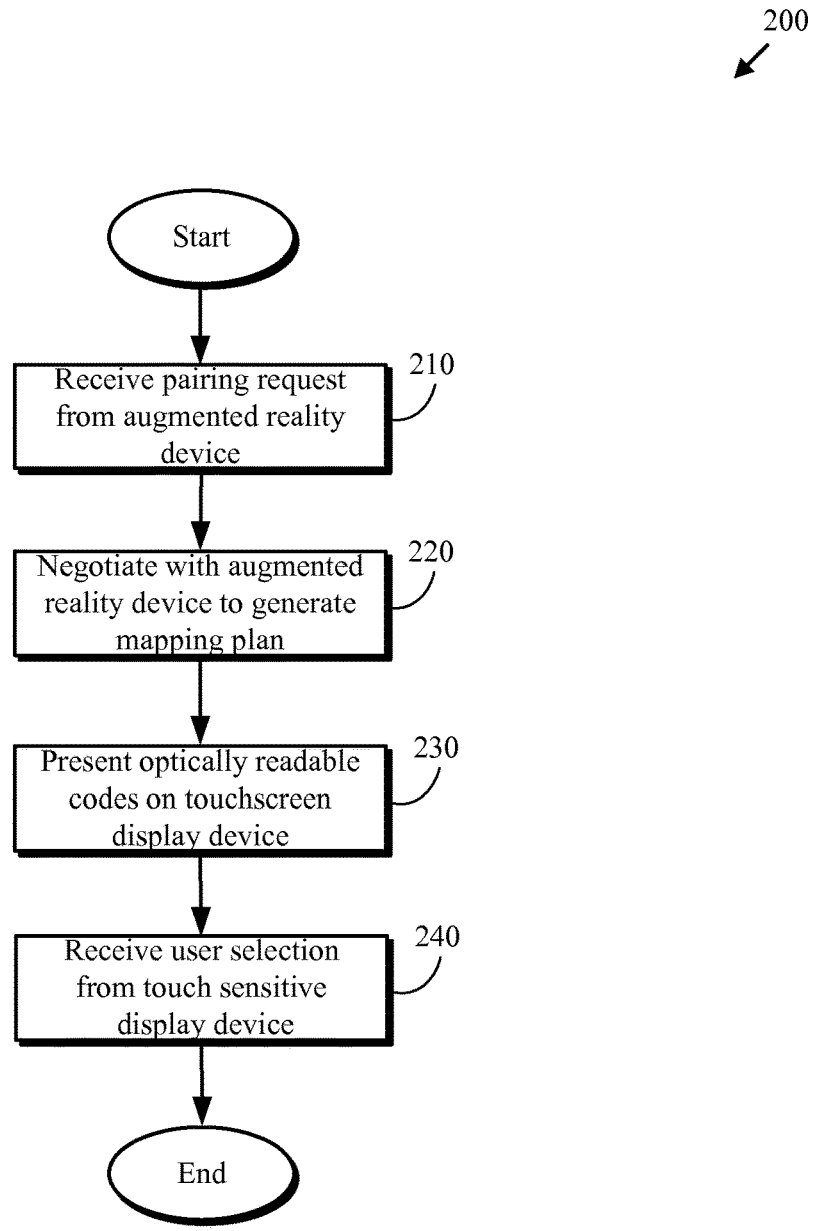
FIG. 2 is a flowchart depicting an augmented reality method, in accordance with at least one embodiment of the present invention.

FIG. 2 is a flowchart depicting an augmented reality method 200, in accordance with at least one embodiment of the present invention. As depicted, augmented reality method 200 includes receiving (210) a pairing request, negotiating (220) with an augmented reality device, presenting (230) optically readable codes on a touchscreen device, and receiving (240) a user selection from a touchscreen device. Augmented reality method 200 enables encrypted optically readable codes to be presented on a touchscreen device.

Receiving (210) a pairing request may include augmented reality module 112 receiving a pairing request from an augmented reality device (e.g., augmented reality device 140). The pairing request may be initiated using secure communications over a personal area network (PAN) such as personal area network 180. The communications may be of varying formats such as, but not limited to, Bluetooth technology, optical signals that are out of the visible spectrum, and audio based communications. The pairing operations may be referred to as a handshake. During the handshake operation, augmented reality module 112 and augmented reality device 140 exchange information permitting a secure communication to begin.

Negotiating (220) with an augmented reality device may include augmented reality module 112 providing, to augmented reality device 140, a mapping plan for presenting optically readable codes on a touchscreen device. The mapping plan may identify the number of optically readable codes on the touchscreen device and the location of each on the touchscreen device. The mapping plan may also identify or provide both the optically readable codes, and the images corresponding to each of the optically readable codes. Additionally, augmented reality module 112 may provide, to augmented reality device 140, a new encryption key necessary to decrypt the optically readable codes. Augmented reality module 112 may encrypt the optically readable codes prior to displaying them on the touchscreen. The encryption key may be required by augmented reality device 140 to decrypt the optically readable codes prior to overlaying the optically readable codes with images. In some embodiments, the encryption key is a single-session key (i.e., a unique, session specific, encryption key is generated for each pairing session). In other embodiments, a pairing session expires after a predetermined duration, and touchscreen device 114 redisplays the authentication challenge after the encryption key and mapping plan are renegotiated.

Presenting (230) optically readable codes on a touchscreen device may include augmented reality module 112 encrypting each optically readable code using the encryption key provided to augmented reality device 140 during negotiation operation 220. Augmented reality module 112 may place each optically readable code on touchscreen device 114 according to the mapping plan. In some embodiments, the optically readable codes are visible to an individual not using augmented reality device 140, but the images corresponding to the optically readable codes are not visible. In other embodiments, the optically readable codes will not be visible, meaning that an individual not using augmented reality device 140 will see nothing additional on the touchscreen device during an authentication challenge.

Receiving (240) a user selection from a touchscreen device may include augmented reality module 112 receiving input from the touchscreen device. Each optically readable code has a value associated with it, and each image corresponding to and optically readable code has the same value associated with it. For example, if the touchscreen device contains pictures of a cat (code=1), a dog (code=2), a goldfish (code=8), and a cow (code=9), and the user touches cow, cow, cat, dog, then the pin sent to augmented reality module 112 would be 9912. If a user without augmented reality device 140 (i.e. he can't see the overlay images) were to touch the anchor point for cow, the anchor point for cow, the anchor point for cat, the anchor point for dog, then the pin sent to augmented reality module 112 would still be 9912. The input received from the touchscreen device is passed to client 110 for validation.

Figure 3:
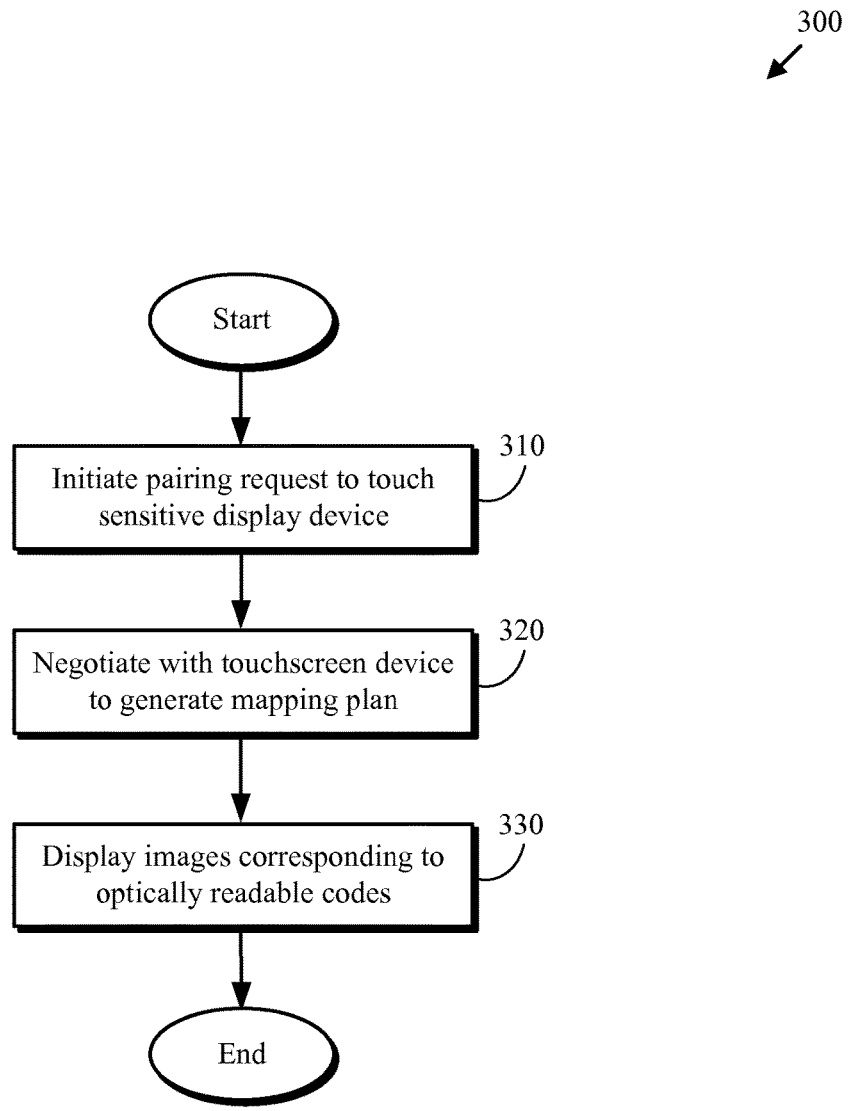
FIG. 3 is a flowchart depicting an image display method, in accordance with at least one embodiment of the present invention.

FIG. 3 is a flowchart depicting an image display method 300, in accordance with at least one embodiment of the present invention. As depicted, image display method 300 includes initiating (310) a pairing request, negotiating (320) with a touchscreen device, and displaying (330) images corresponding to optically readable codes. Image display method 300 enables an augmented reality device to overlay anchor points on a touchscreen device 114 with images corresponding images.

Initiating (310) a pairing request may include augmented reality device 140 sending a pairing request to client 110. The pairing request may be initiated using secure communications over a personal area network (PAN) such as personal area network 180. The communications may be of varying formats such as, but not limited to, Bluetooth technology, optical signals that are out of the visible spectrum, and audio based communications. During the pairing operation, augmented reality device 140 and augmented reality module 112 exchange information permitting a secure communication to begin.

Negotiating (320) with a touchscreen device may include augmented reality device 140 receiving a mapping plan for detecting optically readable codes (e.g., anchor points) on touchscreen device 114 and a new encryption key necessary to decrypt the optically readable codes. The mapping plan may identify the number and location of optically readable codes on the touchscreen device. Knowing the number and location of optically readable codes enhances performance of augmented reality device 140 by avoiding the requirement to search the entire touchscreen device for optically readable codes.

Displaying (330) images corresponding to optically readable codes may include augmented reality device 140 decrypting each optically readable code and overlaying the code with an image corresponding to the code. In some embodiments, an overlay image is retrieved by decoding an optically readable code (e.g., a QR code is decoded to retrieve an image of a cat). In other embodiments, an overlay image corresponding to an optically readable code is provided as part of the mapping plan during the negotiate operation 320.

Figure 4:
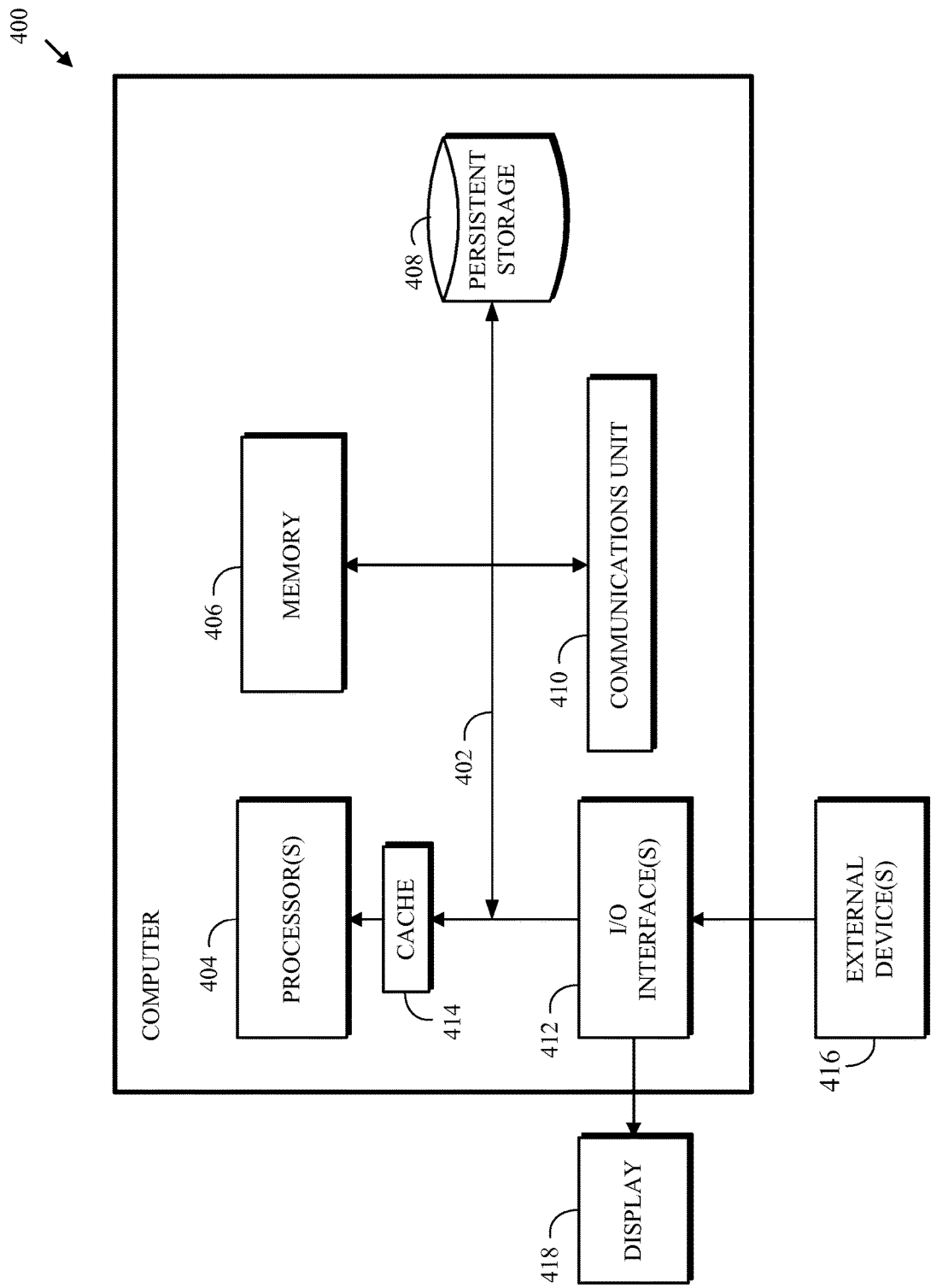
FIG. 4 is a block diagram depicting various components of one embodiment of a computer suitable for executing the methods disclosed herein.

FIG. 4 depicts a block diagram of components of a computer system 400, which is an example of systems such as client 110, server 120, and augmented reality device 140 within augmented reality computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client 110, server 120, and augmented reality device 140 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., augmented reality method 200 and image display method 300 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client 110, server 120, and augmented reality device 140. In these examples, communications unit 410 includes one or more network interface cards. Communications unit 410 may provide communications through the use of either or both physical and wireless communications links. Program instructions and data used to practice embodiments of augmented reality method 200 and image display method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An augmented reality display device comprising:
    an augmented reality display hardware set for simultaneously displaying displays that include: (i) a display portion corresponding to the real world, and (ii) a computerized overlay portion;
    a processor(s) set;
    a storage medium; and
    computer code stored on the storage medium, with the computer code including data and instructions to cause the processor(s) set to perform at least the following operations:
        receiving a set of decryption key(s) for decrypting QR codes,
        receiving a first image that includes in the image a representation of a touchscreen display device display including a QR keyboard that includes a plurality of QR codes respectively corresponding to alphanumeric keys,
        decrypting the QR codes of the QR keyboard respectively corresponding to alphanumeric keys to obtain respectively corresponding sets of alphanumeric character(s),
        generating computerized overlay information corresponding to the sets of alphanumeric character(s) respectively corresponding to the decrypted QR codes of the QR keyboard in the first image,
        creating a first augmented reality display data set including the sets of alphanumeric character(s) overlaying the respectively corresponding QR codes of the QR keyboard portion of the first image, and
        displaying a first augmented reality display according to the first augmented reality display data set.

2. The augmented reality display device of claim 1 wherein the augmented reality display hardware set includes:
    a transparent portion for allowing the display portion corresponding to the real world to be visually communicated to a user; and
    a computerized overlay displaying hardware set for displaying the computerized overlay portion.

3. The augmented reality display device of claim 1 wherein the augmented reality display hardware set includes:
    an image combining module for combining the display portion corresponding to the real world with the computerized overlay portion to created augmented reality images; and
    a display for displaying the augmented reality images.

4. A system comprising:
    computer device comprising:
        a touchscreen display user interface device,
        a processor(s) set,
        a storage medium, and
        computer code stored on the storage medium, with the computer code including data and instructions to cause the processor(s) set to perform at least the following operations:
            receiving a mapping plan data set including information indicative of: (i) a plurality of alphanumeric keys for a display of a keyboard, and (ii) relative locations among and between the alphanumeric keys of the keyboard,
            receiving a set of encryption key(s) for encrypting the alphanumeric keys into a plurality of respectively corresponding QR codes,
            encrypting the alphanumeric keys of the mapping plan into a plurality of respectively corresponding QR codes using the set of encryption key(s),
            creating a QR keyboard display data set that corresponds to a display of a QR keyboard including the plurality of QR codes arranged into a keyboard display according to the relative locations of the mapping plan data set,
            displaying the QR keyboard on the touchscreen display user interface device, and
            receiving user input corresponding to keystrokes made by a user on the QR keyboard displayed on the touchscreen display user interface device; and
    an augmented reality display device comprising:
        an augmented reality display hardware set for simultaneously displaying displays that include: (i) a display portion corresponding to the real world, and (ii) a computerized overlay portion,
        a processor(s) set,
        a storage medium, and
        computer code stored on the storage medium, with the computer code including data and instructions to cause the processor(s) set to perform at least the following operations:
            receiving a set of decryption key(s) for decrypting QR codes,
            receiving a first image that includes in the image a representation of a touchscreen display device display including the QR keyboard that includes the plurality of QR codes respectively corresponding to alphanumeric keys, decrypting the QR codes of the QR keyboard respectively corresponding to alphanumeric keys to obtain respectively corresponding sets of alphanumeric character(s), generating computerized overlay information corresponding to the sets of alphanumeric character(s) respectively corresponding to the decrypted QR codes of the QR keyboard in the first image, creating a first augmented reality display data set including the sets of alphanumeric character(s) overlaying the respectively corresponding QR codes of the QR keyboard portion of the first image, and displaying a first augmented reality display according to the first augmented reality display data set.

5. The system of claim 4 wherein the computer device is in the form of a smart phone.

6. The system of claim 4 wherein:

each alphanumeric key respectively corresponds to a set of alphanumeric character(s); and the encryption of each given alphanumeric key includes encrypting the set of alphanumeric character(s) respectively corresponding to the given alphanumeric key.

7. The system of claim 4 wherein the user is viewing an augmented reality display with a computerized overlay portion of the augmented reality display showing alphanumeric characters in place of the QR codes of the QR keyboard.

8. The system of claim 4 wherein the augmented reality display hardware set includes:

a transparent portion for allowing the display portion corresponding to the real world to be visually communicated to the user; and a computerized overlay displaying hardware set for displaying the computerized overlay portion.

9. The system of claim 4 wherein the augmented reality display hardware set includes:

an image combining module for combining the display portion corresponding to the real world with the computerized overlay portion to created augmented reality images; and a display for displaying the augmented reality images.

* * * * *